United States Patent [19]

Paros et al.

[11] 4,321,500

[45] Mar. 23, 1982

[54] LONGITUDINAL ISOLATION SYSTEM FOR FLEXURALLY VIBRATING FORCE TRANSDUCERS

[75] Inventors: Jerome M. Paros; Donald W. Busse, both of Redmond, Wash.

[73] Assignee: Paroscientific, Inc., Redmond, Wash.

[21] Appl. No.: 103,918

[22] Filed: Dec. 17, 1979

[51] Int. Cl.³ .......................................... H01L 41/08
[52] U.S. Cl. .................... 310/321; 310/338; 310/323; 310/25
[58] Field of Search ............... 310/25, 368, 369, 370, 310/321, 323, 330, 331, 338, 15; 73/777, 778, 781, 141 R, DIG. 1, DIG. 4; 357/26; 338/47, 2

[56] References Cited

U.S. PATENT DOCUMENTS

| | | | |
|---|---|---|---|
| 3,470,400 | 9/1969 | Weisbord | 310/323 X |
| 3,479,536 | 11/1969 | Norris | 310/323 |
| 3,480,809 | 11/1969 | Grib | 310/25 |
| 4,215,570 | 8/1980 | Nisse | 310/338 X |

*Primary Examiner*—Mark O. Budd
*Attorney, Agent, or Firm*—Seed, Berry, Vernon & Baynham

[57] ABSTRACT

A system for isolating the mounting pads of a vibrating beam or tuning fork force transducers from longitudinal vibrations generated by transverse vibrations of the beam or tuning fork tines which extend between the mounting pads. The system includes an arrangement of longitudinally resilient support links and masses that flex responsive to change in the length of the beam or tines as the beam or tines vibrate transversely. The support links and masses thus isolate the mounting pads from the longitudinally vibrations of the beam or tuning fork tines while allowing transmission of forces applied between the mounting pads which vary the force dependent resonant frequency of the beam or tuning fork.

15 Claims, 8 Drawing Figures

LONGITUDINAL ISOLATION SYSTEM FOR FLEXURALLY VIBRATING FORCE TRANSDUCERS

BACKGROUND OF THE INVENTION

1. Field of the Invention

This invention relates to vibrating beam or tuning fork force transducers and, more particularly, to a system for isolating the mounting pads for the beam or tuning fork from longitudinal vibrations of the beam or tuning fork induced by transverse vibrations of the beam or tuning fork.

2. Description of the Prior Art

Conventional flexurally vibrating force transducers are highly accurate and completely satisfactory in many applications. However, optimum performance from these transducers is limited by the coupling of energy from the vibratory element—either a beam or the tines of a tuning fork—to the mounting pads which support the element. This energy loss lowers the "Q" (quality factor which is proportional to the ratio of the energy stored to the energy lost each cycle) of the device so that the frequency of vibration of the vibratory element does not precisely respond to changes in the axial force applied to the vibratory element. In the extreme, this energy loss can be so large as to effectively preclude vibration at certain frequencies resulting in marked discontinuities of frequency with axial force applied to the transducer element.

An elongated vibratory element couples energy to the mounting pads in two distinctly different modes. First, transverse movement of the element produces rotational moments about a rotational axis extending through the mounting pad perpendicularly to the plane of beam vibration. This problem has been largely solved by the technique disclosed in U.S. Pat. No. 3,470,400 issued to Weisbord. As the vibratory element moves transversely, however, it also imparts forces to the mounting pads toward and away from each other since the effective length of the vibratory element varies.

While isolating the mounting pads from one type of vibratory transmission has greatly improved the performance of conventional digital force transducers, the energy coupled to the mounting pads through the other type of vibratory transmission can still result in significant performance degradation.

SUMMARY OF THE INVENTION

The primary object of the invention is to provide a flexurally vibrating force transducer having an extremely high quality factor and which is thus highly accurate and low in power consumption.

It is another object of the invention to provide a vibrating force transducer which does not resonate at frequencies other than the resonant frequency of the vibrating beam or tuning fork which is utilized to measure force.

It is another object of the invention to improve the quality factor of conventional vibrating beam force transducers without modifying the basic structure of such transducers.

It is still another object of the invention to provide a vibrating force transducer which does not have performance degradation due to reduced quality factor caused by energy loss through lengthwise vibration of the vibrating element.

These and other objects of the invention are accomplished by placing an isolating element between the mounting pads which support the vibrating beam or tuning fork and the beam or tuning fork itself. The isolation element is relatively stiff in the transverse direction in the plane of vibration so that it provides adequate support for the beam or tuning fork. However, it is relatively compliant in the longitudinal direction so that as the length of the beam or tuning fork tines varies during each cycle of vibration, the isolation element flexes to attenuate the longitudinal force which would otherwise be applied to the mounting pads. The isolation elements are, however, effective in transmitting the longitudinal force applied to the mounting pads toward and away from each other to the vibrating beam or tuning fork tines to vary the resonant frequency of the beam or tines as the longitudinal force varies. In one embodiment of the invention, a conventional vibrating beam force transducer includes a beam extending between a pair of base members, each of which carry a pair of isolation masses which are transversely spaced on opposite sides of the beam. The base members are connected to the mounting pads through respective resilient support members. The isolation masses in combination with the support members have a resonant frequency which is significantly lower than the resonant frequency of the beam so that they isolate the mounting pads from transverse vibrations of the beam. The mounting pads are isolated from longitudinal vibration of the beam by placing isolating elements either between the mounting pads and support elements or between the support elements and base members, or both, while retaining the overall structure of the conventional force transducer.

DETAILED DESCRIPTION OF THE PREFERRED EMBODIMENTS

Figure 1:
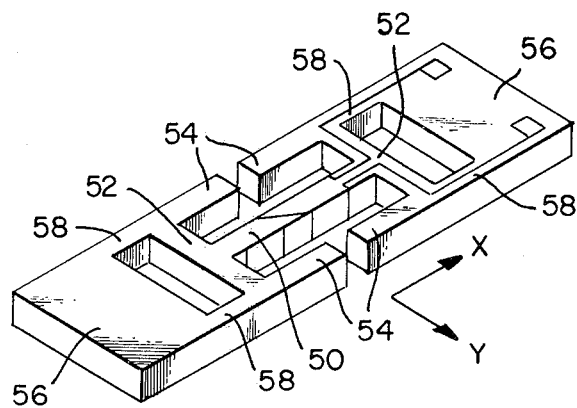
FIG. 1 is an isometric view illustrating a conventional vibrating force transducer employing a conventional structure for isolating the mounting pads from transverse vibrations of the beam.

A conventional vibrating beam force transducer is illustrated in FIG. 1. This transducer, including its mode of operation, is described in the aforementioned U.S. Pat. to Weisbord. Briefly, the beam 50 extends between a pair of base members 52, each of which carry a pair of isolation masses 54 positioned on opposite sides of the beam 50. The base members 52 are connected to respective mounting pads 56 through pairs of parallel, spaced apart flexible support members 58. The support members 58 are compliant in the transverse (Y) direction in which the beam 50 vibrates as indicated by the arrows thereby allowing the beam 50 and masses 54 to move in the transverse direction. The isolation masses 54 in combination with the respective flexible members 58 form an isolation network having a resonant frequency which is lower than that of the beam 50 so that they effectively isolate the mounting pads 56 from the lateral vibration of the beam 50. Without this vibration isolation, the forces and moments of the vibrating beam 50 would be transmitting directly to the mounting pads 56 where the energy would be dissipated through flexing of the pads 56 and the structure (not shown) on which they are mounted.

Figure 2:
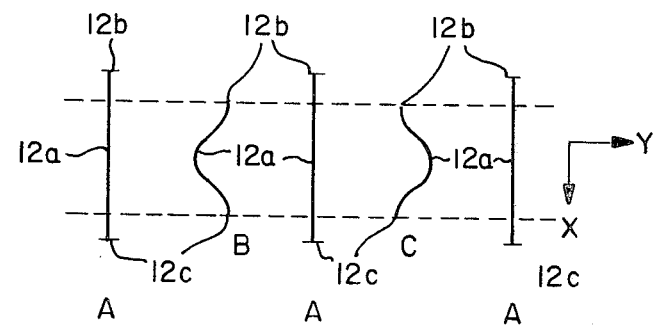
FIG. 2 is a schematic illustrating the manner in which the length of the beam varies as the beam vibrates transversely.

The above described technique for isolating the mounting pads 56 from lateral vibration of the beam 50 does not, however, provide isolation for the longitudinal oscillation of the beam 50 (oscillation in the X direction illustrated in FIG. 1). As illustrated in FIG. 2, when the beam 12 is in its fully extended position (position A), its ends 12b, 12c are somewhat farther apart from each other that when the beam 12 flexes as illustrated in position B. Similarly, the distance between the ends 12a, 12c are substantially closer to each other when the beam flexes to the right (position C) than it is in the straight position (position A). Since the distance between the ends 12b, 12c of the beam shorten twice for each flexing cycle, the frequency of the longitudinal vibrations is twice that of the transverse vibrations. It is extremely undesirable for either the lateral vibrations or the longitudinal vibrations to be transmitted to the mounting pads 56 since this causes energy to be transmitted from the beam to the mounting pads 56. The quality factor of a vibrating beam (the "Q") is proportional to the ratio of the quantity of energy stored during each cycle to the quantity of energy lost during each cycle. A low "Q" reduces the accuracy with which the vibrating beam is able to measure longitudinal forces applied to the mounting pads 56. A low "Q" vibrating crystal connected in an oscillator circuit may allow the circuit to oscillate at a frequency other than the resonant frequency of the crystal, particularly when a longitudinally resonant mode can be excited by the longitudinal contractions occurring at twice the transverse frequency. As described above with respect to FIG. 2, a substantial quantity of energy may be transmitted from the beam 50 to the mounting pads 56, each cycle thereby seriously degrading the "Q" of the transducer. Additionally, the transducer may have spurious resonances both in the vibrating beam 50 and in the structure supporting the mounting pads 56 which can possibly produce erroneous indications.

Figure 3:
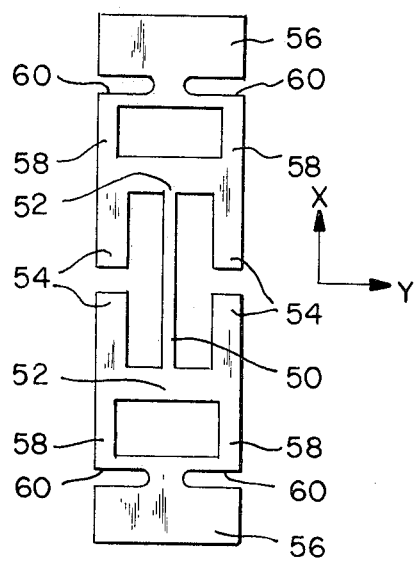
FIG. 3 is a plan view of the force transducer of FIG. 1 employing one embodiment of the inventive longitudinal isolation system.

The "Q" of the transducer illustrated in FIG. 1, and hence the performance of the transducer, can be greatly improved by the inventive transducer structure illustrated in its most basic form in FIG. 3. The structural elements of the transducer of FIG. 3 which are identical to the structural elements for the transducer of FIG. 1 have been given identical reference numerals since the transducers of FIG. 3 functions in the same manner as the transducer of FIG. 1. The transducer of FIG. 3, however, further includes respective pairs of isolation members 58, 60, extending between the resilient beam 50 and the mounting pads 56. The isolation members 60 are relatively stiff in the lateral direction so that they provide adequate support for the beam 50, isolation masses 54 and isolation members 58. However, the isolation elements 60 are relatively compliant in the longitudinal direction so that the members 60 flex toward and away from each other as the distance between the ends of the beam 50 varies in order to isolate the mounting pads 56 from the longitudinal vibration of the beam 50.

While the longitudinal isolation members 60 are effective in isolating the mounting pads 56 from the relatively high frequency vibrations of the beam 50, they nevertheless are entirely capable of transmitting forces applied between the mounting pads 56 to the beam 50 so that the beam 50 has a resonant frequency which is a known function of the force between the mounting pads 56 towards and away from each other.

Figure 4:
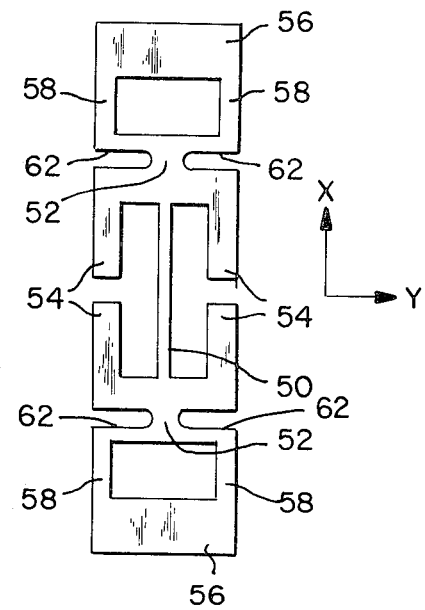
FIG. 4 is a plan view of the force transducer of FIG. 1 employing another embodiment of the longitudinal isolation system.

An alternative structure for isolating the mounting pads 56 from longitudinal vibration of the beam 50 is illustrated in FIG. 4. In this embodiment, longitudinal isolation members 62 extend between the base member 52 and the lateral support members 58 instead of between the lateral isolation members 58 and mounting pads 56. The structure illustrated in FIG. 4 operates in substantially the same manner as the transducer to FIG. 3.

Figure 5:
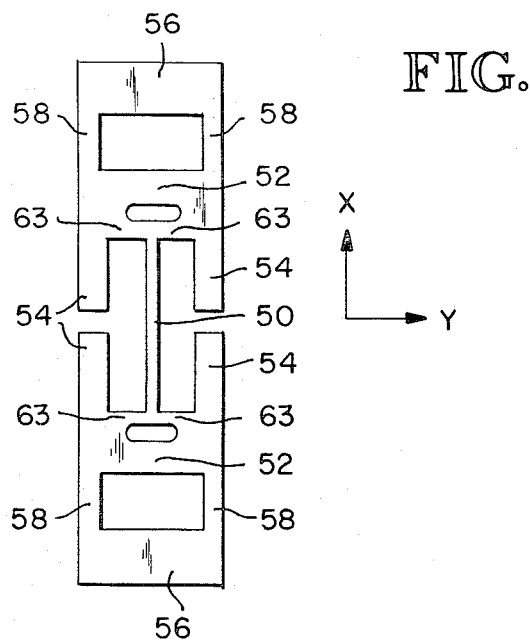
FIG. 5 is a plan view of the force transducer of FIG. 1 employing another embodiment of the longitudinal isolation system.

Another alternative structure for isolating the mounting pads 56 from longitudinal vibration of the beam 50 is illustrated in FIG. 5. In this embodiment, longitudinal isolation members 63 extend between the beam 50 and the base member 52 providing effective isolation of the longitudinal vibration of the beam 50 from the mounting pads 56.

Figure 6:
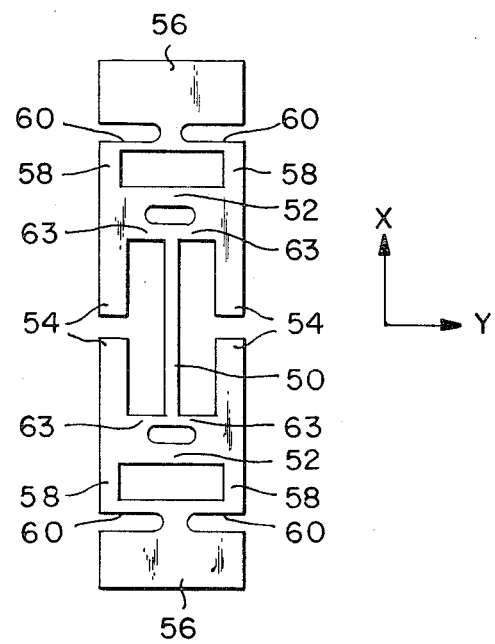
FIG. 6 is a plan view of the force transducer employing a combination of the longitudinal isolators shown in FIGS. 3 and 5.

A combination of the longitudinal vibration isolation elements is illustrated in FIG. 6. The lengthwise vibration of the beam 50 is isolated from the base members 52 by isolation elements 63. The base members 52 are connected to respective mounting pads 56 through pairs of parallel spaced apart, flexible support members 58. The support members 58, in turn, are connected to the mounting pads 56 through the longitudinal isolation elements 60. Both longitudinal isolation elements 63 and 60 are relatively stiff in the lateral direction so that they provide support for the beam 50, isolation masses 54, and lateral support members 58. However, the longitudinal isolation elements 60 and 63 are relatively compliant in the longitudinal direction so that the lengthwise vibration of the beam 50 is effectively isolated from the mounting pads 56.

The beam 50 may be formed of a variety of resilient materials so long as it can be made to vibrate in the lateral direction when driven by an externally generated vibrating force. However, the beam 50 is preferably formed of a piezoelectric crystal, in which case it may be driven by conventional electrical means.

Figure 7:
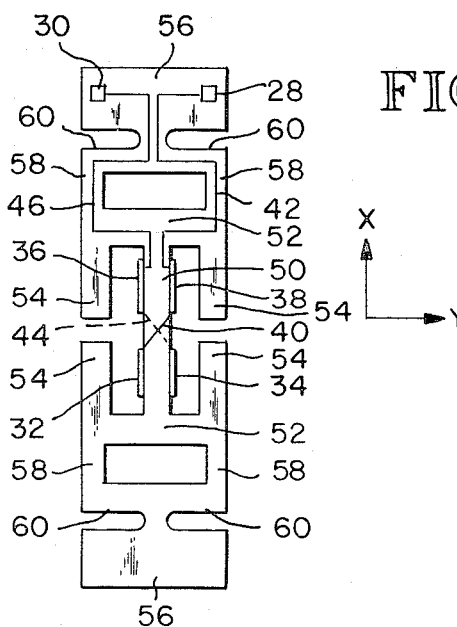
FIG. 7 is a plan view of a force transducer employing the inventive longitudinal isolation system and an electrode configuration for driving the beam.

An electrode configuration for driving the beam 50 is illustrated in FIG. 7 with components that are identical to the components in FIG. 3, identically numbered. Electrodes pairs 32, 34, 36, and 38 are mouned on opposite sides of the beam 50 at spaced apart locations along its length. The electrodes are diagonally connected to each other. In other words, the electrode 32 is connected to electrode 38 through crossover conductor 40 and to a connector pad 28 through conductors 42. Similarly, the electrode 34 is connected to electrode 36 through crossover conductor 44 and to connector pad 30 through conductor 46. When an alternating current electric signal is applied to the terminal pads, 28, 30, the beam 50 alternately flexes or vibrates in a lateral direction Y as indicated by the arrows.

Figure 8:
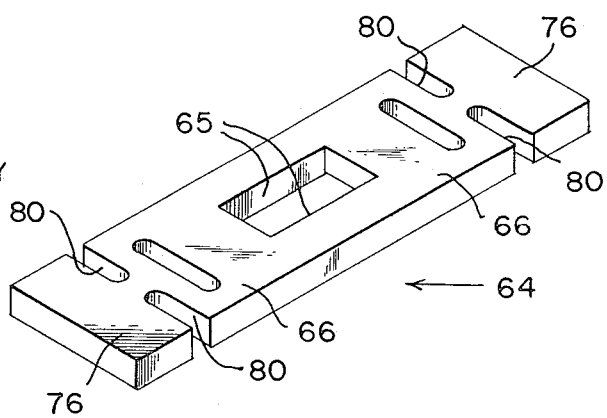
FIG. 8 is an isometric view of a tuning fork force transducer employing the inventive longitudinal isolation system.

The inventive longitudinal isolation system may also be applied to tuning fork force transducers as illustrated in FIG. 8. In a tuning fork force transducer 64 a pair of tuning fork tines 65 project from tuning fork stems 66. The tines 65 may be formed of a piezoelectric material, in which case they can be vibrated by conventional electric means. The tines 65 vibrate 180° out of phase laterally toward and away from each other. The stem 66 is supported by a pair of longitudinal isolation members 80 which are secured to mounting pads 76. The isolation elements 80 flex toward and away from each other as the tines 65 vibrate. The longitudinal isolation elements 80 are effective in isolating the relatively high frequency vibrations of the tines 65, while being capable of transmitting forces applied between mounting pads 76.

We claim:

1. In a vibrating beam force transducer having an elongated, resilient beam, drive means for causing said beam to vibrate at a resonant frequency which is a function of the longitudinal force applied to said beam, a pair of mounting pads and mounting means for connecting the ends of said beam to respective mounting pads such that forces applied to said mounting pads toward and away from each other apply longitudinal forces to said beam to vary the resonant frequency of said beam, the improvement comprising longitudinal isolation means associated with said mounting means for facilitating movement of the ends of said beam toward and away from each other responsive to vibration of said beam thereby isolating said mounting pads from longitudinal movement of the ends of said beam while allowing forces applied between said mounting pads to be transmitted to said beam.

2. The vibrating beam force transducer of claim 1, wherein said longitudinal isolation means comprise support members positioned between at least one end of said beam and its respective mounting pad, said support member being relatively compliant in the longitudinal direction and relatively stiff in the lateral direction.

3. The vibrating beam force transducer of claim 2, wherein said support member includes a pair of resilient, elongated support legs projecting laterally in opposite directions from at least one end of said beam in the plane of beam vibration, with the free ends of said support legs being connected to its respective mounting pad.

4. In a vibrating beam force transducer having a pair of mounting pads, an elongated, resilient beam extending between a pair of base members, each of which carries an isolation mass at opposite ends thereof, a pair of resilient lateral isolation members extending perpendicularly from each of said base members at opposite ends thereof, said lateral isolation members resonating with said isolation masses at a frequency substantially lower than the resonant frequency of said beam, thereby isolating said mounting pads from lateral isolation of said beam, drive means for causing said beam to vibrate at a resonant frequency which is a function of the longitudinal force applied to said beam, a pair of mounting pads and mounting means for connecting the ends of said beam to respective mounting pads such that forces applied to said mounting pads toward and away from each other apply longitudinal forces to said beam to vary the resonant frequency of said beam, the improvement comprising longitudinal isolation means positioned between at least one of said base members and its respective mounting pad to facilitate movement of said base member toward and away from its mounting pad as said beam flexes.

5. The vibrating beam force transducer of claim 4, wherein said longitudinal isolation means comprise elongated support members positioned between at least one of said lateral isolation members and its respective mounting pad, said support members being relatively compliant in the longitudinal direction and relatively stiff in the lateral direction in the plane of vibration of said beam.

6. The vibrating beam force transducer of claim 5, wherein said support members include a flexible, elongated, longitudinal isolation member projecting laterally from at least one of said lateral isolation members toward each other in the plane of beam vibration, with the free ends of said lateral isolation member being connected to its respective mounting pad.

7. The vibrating beam force transducer of claim 4, wherein said longitudinal isolation means comprise support members positioned between at least one of said lateral isolation members and its respective base member, said support members being relatively compliant in the longitudinal direction and relatively stiff in the lateral direction in the plane of vibration of said beam.

8. The vibrating beam force transducer of claim 7, wherein said support members include a resilient, elongated, longitudinal support member projecting laterally from at least one of said lateral isolation members toward each other in the plane of beam vibration, with the free ends of said longitudinal support members being connected to its respective base member.

9. In a vibrating beam force transducer having a pair of mounting pads, an elongated, resilient beam extending between a pair of base members, each of which carries an isolation mass at opposite ends thereof, a pair of resilient lateral isolation members extending perpendicularly from each of said base members at opposite ends thereof, said lateral isolation members resonating with said isolation masses at a frequency substantially lower than the resonant frequency of said beam, thereby isolating said mounting pads from lateral isolation of said beam, drive means for causing said beam to vibrate at a resonant frequency which is a function of the longitudinal force applied to said beam, and mounting means for connecting the ends of said beam to respective mounting pads such that forces applied to said mounting pads toward and away from each other apply longitudinal forces to said beam to vary the resonant frequency of said beam, the improvement comprising longitudinal isolation means associated with said mounting means for facilitating movement of the ends of said beam toward and away from each other responsive to vibration of said beam, thereby isolating said mounting pads from longitudinal movement of the ends of said beam while allowing forces applied between said mounting pads to be transmitted to said beam, said longitudinal isolation means including a first pair of resilient, elongated support members positioned between at least one end of said beam and its respective base member, and a second pair of resilient elongated support members positioned between at least one of said lateral isolation members and its respective mounting pad, said support members being relatively compliant in the longitudinal direction and relatively stiff in the lateral direction in the plane of vibration of said beam to facilitate movement of the ends of said beam toward and away from each other and the movement of said base member toward and away from respective mounting pads as said beam flexes.

10. The vibrating beam force transducer of claim 9, wherein said first pair of support members include a pair of resilient, elongated, longitudinal isolation members projecting laterally from said beam end toward said base member in the plane of beam vibration and wherein said second pair of support members include a pair of resilient, elongated, longitudinal isolation members projecting laterally from said lateral isolation member toward each other in the plane of beam vibration, with the free ends of said second pair of lateral isolation members being connected to respective mounting pads.

11. In a vibrating beam force transducer having a pair of mounting pads, an elongated, resilient beam extending between a pair of base members, each of which carries an isolation mass at opposite ends thereof, a pair of resilient lateral isolation members extending perpendicularly from each of said base members at opposite ends thereof, said lateral isolation members resonating with said isolation masses at a frequency substantially lower than the resonant frequency of said beam, thereby isolating said mounting pads from lateral isolation of said beam, drive means for causing said beam to vibrate at a resonant frequency which is a function of the longitudinal force applied to said beam, and mounting means for connecting the ends of said beam to respective mounting pads such that forces applied to said mounting pads toward and away from each other apply longitudinal forces to said beam to vary the resonant frequency of said beam, the improvement comprising longitudinal isolation means associated with said mounting means for facilitating movement of the ends of said beam toward and away from each other responsive to vibration of said beam, thereby isolating said mounting pads from longitudinal movement of the ends of said beam while allowing forces applied between said mounting pads to be transmitted to said beam, said longitudinal isolation means including a first pair of resilient, elongated support members positioned between at least one end of said beam and its respective base member, and a second pair of resilient, elongated support members positioned between at least one of said lateral isolation members and its respective base member, said support members being relatively stiff in the lateral direction in the plane of vibration of said beam to facilitate movement of the ends of said beam toward and away from each other and the movement of said base member toward and away from respective mounting pads as said beam flexes.

12. The vibrating force transducer of claim 11, wherein said first pair of support members include a pair of resilient, elongated, longitudinal isolation members projecting laterally from at least one end of said beam toward its respective base member in the plane of beam vibration and wherein said second pair of support members include a pair of resilient, elongated, longitudinal isolation members projecting laterally from at least one of said lateral isolation members toward each other in the plane of beam vibration, with the free ends of said second pair of longitudinal support members being connected to respective base members.

13. In a tuning fork force transducer including a tuning fork having a pair of flexible tuning fork tines projecting between tuning fork stems, drive means for causing said tines to vibrate at a resonant frequency which is a function of the longitudinal force applied to said tines, a first mounting pad to which said first stem is secured, a second mounting pad to which second said stem is attached such that forces applied to said mounting pads toward and away from each other apply longitudinal forces to the tines of said tuning fork to vary the resonant frequency of said tuning fork, the improvement comprising longitudinal isolation means for allowing movement of the free ends of said tuning fork toward and away from said mounting pads responsive to vibration of said tuning fork thereby isolating said mounting pads from longitudinal movement of the free ends of said tines with respect to said stem while allowing forces applied between said mounting pads to be transmitted to said tines.

14. The tuning fork force transducer of claim 13, wherein said longitudinal isolation means comprise a support member positioned between a portion of said tuning fork and one of said mounting pads, said support members being relatively compliant in the longitudinal direction and relatively stiff in the lateral direction in the plane of vibration of said tines.

15. The tuning fork force transducer of claim 14, wherein said support members include a pair of resilient, longitudinal isolation members projecting laterally from one of said mounting pads in opposite directions in the plane of vibration of said tines with the free ends of said isolation members being secured to a portion of said tuning fork.

* * * * *